(12) United States Patent
Meurle

(10) Patent No.: US 8,212,666 B2
(45) Date of Patent: Jul. 3, 2012

(54) MOTOR VEHICLE HAVING HYBRID DRIVE AND EXTERNAL DISPLAY DEVICE FOR DISPLAYING A CURRENT OPERATING MODE OF THE HYBRID DRIVE

(75) Inventor: Jürgen Meurle, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/131,195

(22) PCT Filed: Nov. 18, 2009

(86) PCT No.: PCT/EP2009/008186
§ 371 (c)(1),
(2), (4) Date: May 25, 2011

(87) PCT Pub. No.: WO2010/060556
PCT Pub. Date: Jun. 3, 2010

(65) Prior Publication Data
US 2011/0227719 A1    Sep. 22, 2011

(30) Foreign Application Priority Data

Nov. 26, 2008   (DE) .......................... 10 2008 059 147

(51) Int. Cl.
*B60Q 1/26* (2006.01)

(52) U.S. Cl. ........................................ 340/468; 340/463
(58) Field of Classification Search .................. 340/463, 340/468
See application file for complete search history.

(56) References Cited

U.S. PATENT DOCUMENTS

| 3,691,525 A | 9/1972 | McClellan, Sr. et al. |
| 4,430,692 A | 2/1984 | Papadakis |
| 4,631,516 A | 12/1986 | Clinker |
| 5,486,808 A * | 1/1996 | Nejdl ............................. 340/464 |
| 7,893,822 B2 * | 2/2011 | Gerber .......................... 340/463 |
| 2003/0039123 A1 | 2/2003 | Crisick |
| 2005/0128065 A1 | 6/2005 | Kolpasky et al. |
| 2008/0123871 A1 | 5/2008 | Trzmiel |
| 2009/0021364 A1 * | 1/2009 | Frey et al. ...................... 340/468 |
| 2009/0040032 A1 * | 2/2009 | Gerber .......................... 340/438 |

FOREIGN PATENT DOCUMENTS

| DE | 91 09 765 U1 | 12/1992 |
| DE | 43 19 605 C1 | 7/1994 |
| DE | 44 31 190 A1 | 3/1996 |
| DE | 10 2007 003 201 | 5/2008 |
| EP | 0 873 910 A2 | 10/1998 |
| EP | 1 953 022 A1 | 8/2008 |
| NL | 8 300 073 | 8/1984 |
| WO | WO 2006/001809 | 1/2006 |

* cited by examiner

*Primary Examiner* — Travis Hunnings
(74) *Attorney, Agent, or Firm* — Henry M. Feiereisen; Ursula B. Day; Stefan Knirr

(57) ABSTRACT

A motor vehicle has a hybrid drive that includes a first drive unit and a second low-emission drive unit. The motor vehicle can be driven in travel mode in different modes of operation of the hybrid drive at least either by the first drive unit or by the second low-emission drive unit. To determine a current emission of pollutants and/or substances that are harmful to the climate and/or the noise emissions of such a motor vehicle, a display device is placed at a location of the motor vehicle so as to be clearly visible from outside the motor vehicle during the travel mode for displaying a current mode of operation of the hybrid drive.

9 Claims, 1 Drawing Sheet

MOTOR VEHICLE HAVING HYBRID DRIVE AND EXTERNAL DISPLAY DEVICE FOR DISPLAYING A CURRENT OPERATING MODE OF THE HYBRID DRIVE

CROSS-REFERENCES TO RELATED APPLICATIONS

This application is the U.S. National Stage of International Application No. PCT/EP2009/008186, filed Nov. 18, 2009, which designated the United States and has been published as International Publication No. WO 2010/060556 A1 and which claims the priority of German Patent Application, Serial No. 10 2008 059 147.5, filed Nov. 26, 2008, pursuant to 35 U.S.C. 119(a)-(d).

BACKGROUND OF THE INVENTION

The invention relates to a motor vehicle having a hybrid drive with more than one drive unit, as well as to a method for operating a motor vehicle having a hybrid drive.

Operation of motor vehicles that exceed predefined limit values of fine dust emissions have to comply already today in some cities and towns with regulations which put restrictions on the operation of these motor vehicles and approve operation only under certain conditions. In order to be able to check compliance with the regulations, motor vehicles operated in these cities and towns must carry a so-called fine dust sticker on the windshield in a very visible way for monitoring authorities or their executive bodies to show in which of four pollutant groups the motor vehicle is classified.

As the reduction of emissions reaches its limits not only in regard to fine dusts but also to air pollutants such as NOx, CO or unburned hydrocarbons as well as to substances that are harmful to the climate, such as $CO_2$, emanating from internal combustion engines of motor vehicles, regulations can be expected in the future that are not only directed to fine dusts but increasingly also for other pollutants or substances that are harmful to the climate, thus leading to restrictions in the operation of motor vehicles with emissions of substances above a limit value in zoned areas, for example, within city limits, towns or entire regions. The same may also be basically true for noise emissions.

While motor vehicles with a single drive unit enable an unambiguous classification to a predefined pollutant class or pollutant group, this is not the case when motor vehicles of the afore-stated type with a hybrid drive are involved because both drive units of these motor vehicles typically exhibit totally different pollutant emissions. For that reason, such motor vehicles do not allow control of compliance of regulations for limiting the emission of pollutants and/or substances that are harmful to the climate by using a sticker visible from the outside on the windshield.

As the development of motor vehicles aims on one hand to equip motor vehicles increasingly with a hybrid drive and as there are increasingly more development projects for motor vehicles which involve examination and testing of most different combinations of drive units, i.e. not only the currently typical combination of an internal combustion engine with one or two electric motors, determination as to whether a motor vehicle is authorized or not authorized to operate in a zone with regulated emission of pollutants will in all likelihood become more difficult in the future.

SUMMARY OF THE INVENTION

Starting from this, the invention is based on the object to improve a motor vehicle with a hybrid drive and a method for operating a motor vehicles with a hybrid drive of the aforementioned type in such a way that the actual discharge of pollutants and/or substances that are harmful to the climate and/or actual noise emissions of the motor vehicles can be more easily ascertained.

This object is attained in accordance with the invention by a display device which is clearly visible outside of the motor vehicle during operation for displaying the current mode of operation of the hybrid drive.

A hybrid drive involves within the scope of this patent application a motor vehicle drive with two different drive units or energy converters, like for example electric motors, Otto engines, diesel engines, or gas engines, which can be operated individually or jointly in dependence on the respective driving situation and/or the driver's desire, and which are supplied for this purpose by two different energy stores carried in the motor vehicle, such as for example a battery and a fuel or gas tank.

Designated as a low-emission drive unit within the scope of the invention is the one drive unit which in general or during the actual travel conditions emits less pollutants or substances that are harmful to the climate or noise or emits less pollutants or substances that are harmful to the climate that are relevant for compliance of certain regulations. In the case of a hybrid drive with an internal combustion engine and an electric motor, the latter one is the drive unit which constitutes the low-emission with respect to air pollutants, like NOx, CO, unburned hydrocarbons and fine dust or soot particles as well as with respect to substances that are harmful to the climate, like $CO_2$, or noise.

The term clearly visible is to be understood within the scope of this patent application as relating to a display device which is well visible during travel for other road users or monitoring authorities or surveillance cameras so that the mode of operation displayed by the display device can rapidly and easily be determined and evaluated. This precludes a display device arranged on the instrument panel of the motor vehicle because it is not sufficiently visible during travel even for a driver of the motor vehicle to draw conclusions about the mode of operation of the hybrid drive of the vehicle. The fact that the mode of operation during travel has to be clearly visible is of importance because the mode of operation can change when the vehicle stops.

A preferred configuration of the invention provides for an arrangement of the display device on the outer side of the motor vehicle where it is normally most visible. For this purpose, the display device may be integrated for example in a body structure of the outer side of the motor vehicle of the motor vehicle, such as for example in a mirror housing of outside mirrors, a roof, a motor hood, a bumper, or wheel coverings of the motor vehicle.

In order to ensure a good recognition capability of the display device even when the visibility or lighting is poor, the display device includes preferably at least one illumination device, such as a light or light-emitting diode.

The display device may be switched on either in both modes of operation and display the respective mode of operation in a different way, for example by different colors, it may however also be provided to switch on the display device only in the second low-emission mode of operation while otherwise keeping it switched off.

Besides a display through different colors or switching states of lighting devices, the display device may also display both modes of operation by different lettering, symbols or depictions.

While the display device is preferably controlled by an on-board computer of the motor vehicle in accordance with the current mode of operation of the hybrid drive, it may also be suitable to provide within the motor vehicle a device for switching the display device on and off so that the driver is able to optionally disable the display device.

BRIEF DESCRIPTION OF THE DRAWING

An exemplary embodiment of the invention will now be described in greater detail with reference to the drawing. The sole FIGURE shows a passenger car 1 with a hybrid drive (not visible) as well as several alternative options to display the current mode of operation of the hybrid drive for persons outside the passenger car in a visible manner.

DETAILED DESCRIPTION OF PREFERRED EMBODIMENTS

Figure 1:
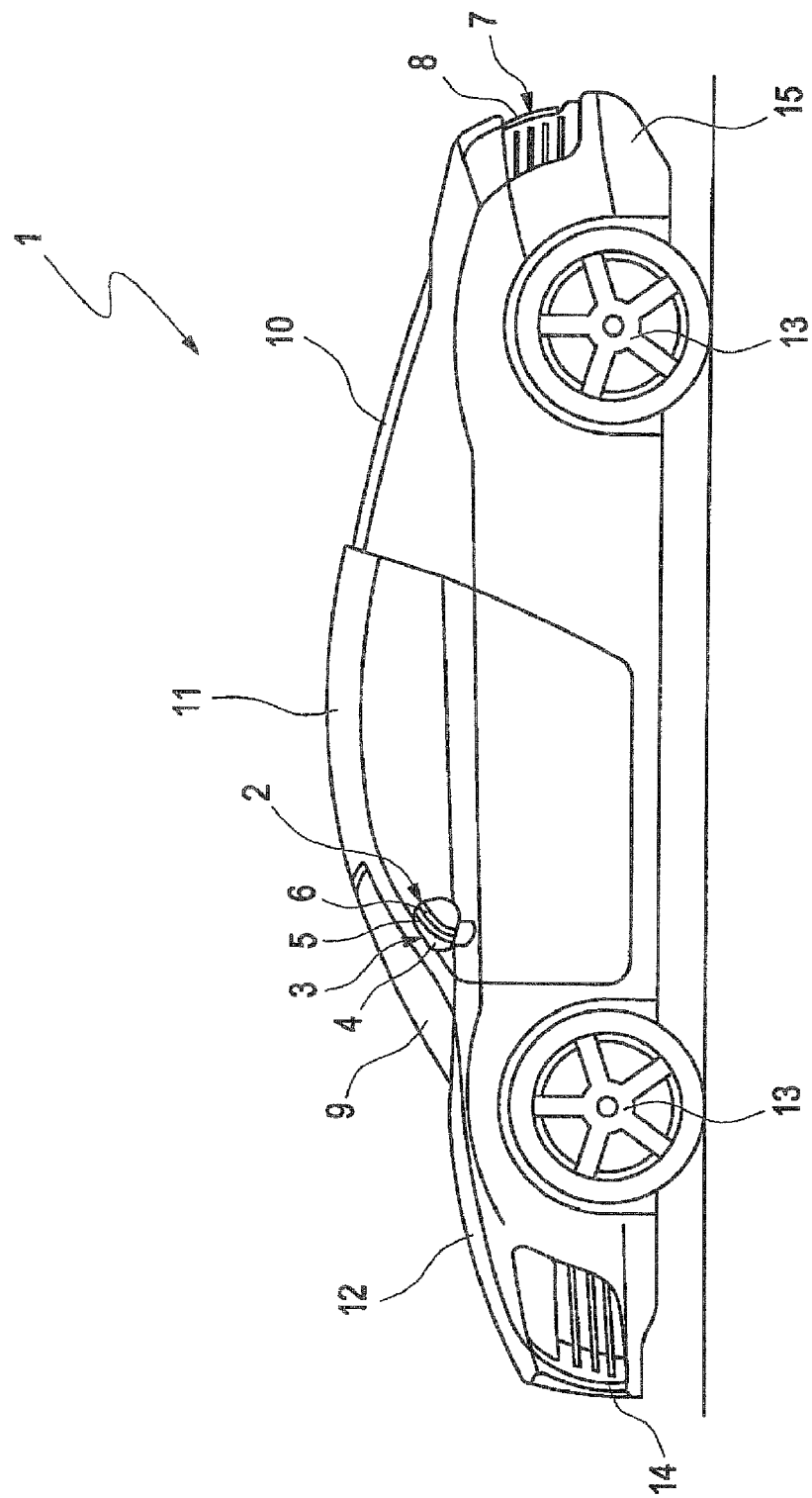

The passenger car 1 shown in the drawing is operated by the hybrid drive which may involve for example a hybrid drive known per se and including an internal combustion engine and one or two electric motors in parallel or power-branching arrangement in relation to the combustion engine. As the electric motor does not emit any pollutants, like NOx, CO, unburned hydrocarbons and fine dust or substances that are harmful to the climate, such as $CO_2$, and also runs quieter than the internal combustion engine, the hybrid drive produces in this mode of operation less emission compared to other modes of operation in which during travel either only the internal combustion engine or the internal combustion engine in combination with the electric motor or one of the electric motors drives the passenger car 1.

As opposed to a passenger car or another motor vehicle with a single drive motor, such as an internal combustion engine, which can be provided for example on its windshield with a sticker displaying the pollutant group or pollutant class of the drive motor, the illustrated passenger car 1 does not allow an unambiguous classification in a certain pollutant group or pollutant class because the pollutant emissions of the passenger car 1 may exhibit very great differences, depending on which of the afore-mentioned modes of operation the hybrid drive currently operates.

This also means that in zones that impose restrictions on the operation of motor vehicles as a result of emissions of certain pollutants or substances that are harmful to the climate exceeding predefined limit values, traffic monitoring authorities and their executive bodies are unable to ascertain whether the emissions of the passenger car 1 exceed the predefined limit values.

To prevent that for this reason the traffic monitoring authorities impose as a general rule restrictions for the operation of the passenger car 1 in all modes of operation, the passenger car 1 is provided with a display device which is clearly visible during travel from outside the passenger car 1 and alternatingly automatically displays the current mode of operation of the hybrid drive or allows display at the desire of the driver.

According to a first embodiment, this display device 2 is integrated in two outside mirrors 3 (only one is visible) of the passenger car 1. The outside mirrors 3 have a mirror housing 4 which includes two or three differently colored transparent housing parts 5, 6 and lights (not shown) in the interior of each housing part 5, 6, respectively. For example, provisions may be made to dye one of two differently colored transparent housing parts 5, 6 of the outside mirrors 3 of the passenger car 1 in red color and the other in green color, and to automatically switch on the light in the interior of the housing part 5 dyed red as soon as the internal combustion engine of the hybrid drive is started while the light in the interior of the housing part 6 dyed green assumes the on-state only when the hybrid drive operates in the purely electric travel mode and the internal combustion engine is shut down.

According to a second embodiment, the display device 2 is again integrated in the two outside mirrors 3 of the passenger car 1, with the housing 4 thereof or part of its transparent housing 4 being dyed however only in a single color, for example green, and a light (not shown) arranged inside the mirror housing 4 or mirror housing part becomes operational only when the hybrid drive operates in the purely electric travel mode. In this case, an additional switch may be provided in the interior of the passenger car 1 for permitting the driver to interrupt the current supply to the light when driving for example in an unregulated zone and when wanting to prevent other road users to see the current mode of operation of the hybrid drive of the passenger car 1.

According to a third embodiment, the display device is configured as display 7 and arranged for example in the proximity of a rear license plate 8 of the passenger car 1. The display, for example a LCD or LED display, is controlled by an on-board computer of the passenger car 1 in dependence on the mode of operation of the hybrid drive and shows the current mode of operation of the hybrid drive by a symbol, a lettering, or other depiction, which can be recognized and evaluated by the traffic monitoring authorities and their executive bodies. As an alternative, also parts of the front or rear window 9, 10 may serve as display to indicate the current mode of operation is shown.

According to a fourth embodiment, well visible body structures on the outer side of the passenger car 1, such as a roof 11, a motor hood 12, wheel coverings 13, or parts of a front or rear bumper 14, 15 may be used as a display device, with the current mode of operation of the passenger car 1 being displayed by a colored change or a different illumination of one of these body structures 11, 12, 13, 14, 15, wherein the display is triggered in the case of transparent or translucent body structures for example by OLEDs (Organic Light Emitting Diodes) or other lighting elements, which can be arranged behind the body structures 11, 12, 13, 14, or integrated therein.

What is claimed is:

1. A motor vehicle, comprising:
a hybrid drive having a first drive unit and a second drive unit operating at lower emission than the first drive, wherein the motor vehicle can be operated in travel mode in different modes of operation of the hybrid drive, at least either by the first drive unit or by the second drive unit; and
a display device placed at a location of the motor vehicle so as to be clearly visible from outside of the motor vehicle during the travel mode for displaying a current mode of operation of the hybrid drive, said display device being switched off as long as the first drive unit of the motor vehicle is operative and switched to an on-state when the current mode of operation involves solely an operation of the second low-emission drive unit and the first drive unit is idle.

2. The motor vehicle of claim 1, wherein the display device is arranged on an outer side of the motor vehicle.

3. The motor vehicle of claim 1, wherein the display device is integrated in a body structure of the motor vehicle.

4. The motor vehicle of claim 3, wherein the body structure is a member selected from the group consisting of a mirror housing of an outside mirror, a roof, a motor hood, a bumper, and at least a wheel covering of the motor vehicle.

5. The motor vehicle of claim 1, wherein the display device includes at least one illumination device.

6. The motor vehicle of claim 5, wherein the illumination device is a light or light-emitting diodes.

7. The motor vehicle of claim 1, further comprising a device, arranged within the motor vehicle, for switching the display device between the on-state and an off-state.

8. A method for operating a motor vehicle with a hybrid drive having a first drive unit and a second drive unit operating at lower emission than the first drive, wherein the motor vehicle is operated in travel mode in different modes of operation of the hybrid drive, at least either by the first drive unit or by the second drive unit, said method comprising the steps of:

displaying a current mode of operation of the hybrid drive during travel so as to be visible from outside of the motor vehicle by switching a display device to an on-state only when the current mode of operation involves an operation of the second drive unit to drive the hybrid drive while the first drive is idle, and switching off the display device as long as the first drive unit of the motor vehicle is operative; and switching the display device to the off-state in the absence of an operation of the second low-emission drive unit.

9. The method of claim 8, further comprising the step of placing the display device on an outer side of the motor vehicle.

* * * * *